US012674931B2

(12) United States Patent
Matsui et al.

(10) Patent No.: US 12,674,931 B2
(45) Date of Patent: Jul. 7, 2026

(54) OPTICAL FIBER

(71) Applicant: NTT, Inc., Tokyo (JP)

(72) Inventors: Takashi Matsui, Musashino (JP);
Kazuhide Nakajima, Musashino (JP);
Nobutomo Hanzawa, Musashino (JP);
Yuto Sagae, Musashino (JP)

(73) Assignee: NTT, Inc., Tokyo (JP)

( * ) Notice: Subject to any disclaimer, the term of this
patent is extended or adjusted under 35
U.S.C. 154(b) by 290 days.

(21) Appl. No.: 18/294,124

(22) PCT Filed: Aug. 4, 2021

(86) PCT No.: PCT/JP2021/029010
§ 371 (c)(1),
(2) Date: Jan. 31, 2024

(87) PCT Pub. No.: WO2023/012946
PCT Pub. Date: Feb. 9, 2023

(65) Prior Publication Data
US 2025/0093575 A1     Mar. 20, 2025

(51) Int. Cl.
G02B 6/02          (2006.01)
(52) U.S. Cl.
CPC ................................. G02B 6/02366 (2013.01)
(58) Field of Classification Search
CPC ................................................... G02B 6/02366
USPC ......................................................... 385/125
See application file for complete search history.

(56) References Cited

U.S. PATENT DOCUMENTS

| | | | |
|---|---|---|---|
| 3,901,674 A | * | 8/1975 | Strack ................... C03B 37/027 |
| | | | 65/435 |
| 7,006,751 B2 | | 2/2006 | Provost et al. |
| 2007/0104436 A1 | | 5/2007 | Li et al. |
| 2008/0240663 A1 | | 10/2008 | Dong et al. |
| 2022/0365272 A1 | * | 11/2022 | Chen ................. G02B 6/02304 |

FOREIGN PATENT DOCUMENTS

| | | |
|---|---|---|
| CN | 102359955 A | 2/2012 |
| JP | S50-34550 A | 4/1975 |
| JP | 2008-242459 A | 10/2008 |
| JP | 2020-95128 A | 6/2020 |

OTHER PUBLICATIONS

Y. Tamura et al., "Lowest-Ever 0.1419-dB/km Loss Optical Fiber",
OFC2017, Th5D.1, 2017.
(Continued)

*Primary Examiner* — Jerry M Blevins
(74) *Attorney, Agent, or Firm* — Harness, Dickey &
Pierce, P.L.C.

(57)          ABSTRACT
An object of the present disclosure is to provide an optical
fiber having a simple structure, as well as attaining removal
of loss components generated in an electric field part oozing
out to a core-clad interface or a clad region and reduction in
scattering loss generated from an interface with the clad
region.
The present disclosure relates to an optical fiber including a
core for propagating light, a cladding disposed around the
core, an air layer between the core and the cladding, and two
or more bridges for supporting the core in the air layer.

6 Claims, 10 Drawing Sheets

(56)          References Cited

OTHER PUBLICATIONS

W. Ding et al., "Recent Progress in Low-Loss Hollow-Core Anti-Resonant Fibers and Their Applications", in IEEE Journal of Selected Topics in Quantum Electronics, vol. 26, No. 4, pp. 1-12, Jul.-Aug. 2020.
Dufour et al. "All-Fiber Magneto-Optical Effect Using Nanoparticles Doped Sol-Gel Thin Film Deposited Within Microstructured Fibers." Journal of Lightwave Technology, May 27, 2021, vol. 39, No. 17, pp. 5604-5610, DOI: 10.1109/JLT.2021.3084359.

* cited by examiner

OPTICAL FIBER

CROSS-REFERENCE TO RELATED APPLICATIONS

This application is a 371 U.S. National Phase of International Application No. PCT/JP2021/029010, filed on Aug. 4, 2021. The entire disclosure of the above application is incorporated herein by reference.

TECHNICAL FIELD

The present disclosure relates to an optical fiber with low loss.

BACKGROUND ART

Optical fibers are used in a telecommunication field and many other industrial fields. The loss of the optical fiber is a factor for limiting the transmission quality, transmission distance and efficiency of light, and various techniques for reducing the loss of the optical fiber have been proposed. Currently, an optical fiber for information communication is made of quartz glass as a base material. Regarding an optical fiber including a pure quartz core, a loss of 0.142 dB/km is achieved by optimization of a structure, a manufacturing process, and a manufacturing condition (see, for example, NPL 1).

On the other hand, a Hollow-Core Optical Fiber, employing a hollow core structure, has been proposed. The Hollow-Core Optical Fiber can reduce loss, characteristic of the material due to quartz glass, by confining the light wave in the hollow core. As a hollow core optical fiber, a Photonic Band Gap Optical Fiber and an Anti-Resonant Optical Fiber have been proposed (see, for example, NPL 2).

CITATION LIST

Non Patent Literature

[NPL 1] Y. Tamura et al., "Lowest-Ever 0.1419-dB/km Loss Optical Fiber", OFC2017, Th5D.1, 2017.
[NPL 2] W. Ding et al., "Recent Progress in Low-Loss Hollow-Core Anti-Resonant Fibers and Their Applications", in IEEE Journal of Selected Topics in Quantum Electronics, vol. 26, No. 4, pp. 1-12, July-August 2020.

SUMMARY OF INVENTION

Technical Problem

However, an optical fiber containing quartz glass as a base material has loss components generated in an electric field part oozing out to a core-clad interface or a clad region, which cannot be completely removed, and it is difficult to reduce the loss limit derived from a material owing to quartz glass.

Regarding a Hollow-Core Optical Fiber, it is difficult to reduce the scattering loss occurring at the interface with the clad region. Further, the fiber structure is complex and therefore requires a precision control in manufacturing thereof, which is a problem.

In order to solve the above problems, an object of the present disclosure is providing an optical fiber having a simple structure, as well as attaining removal of loss components generated in an electric field part oozing out to a core-clad interface or a clad region and reduction in scattering loss generated from the interface with the clad region.

Solution to Problem

In order to solve the above problem, the optical fiber of the present disclosure has a structure in which an air layer is provided between a core and a clad, and the core is supported by a bridge.

Specifically, the present disclosure is an optical fiber including a core for propagating light, a cladding disposed around the core, an air layer between the core and the cladding, and two or more bridges for supporting the core in the air layer.

With this structure, the optical fiber of the present disclosure can have a simple structure, as well as attain removal of loss components generated in an electric field part oozing out to a core-clad interface or a clad region and reduction in scattering loss generated from the interface with the clad region.

Further, in the optical fiber according to the present disclosure, a refractive index of the cladding is lower than a refractive index of the core.

Further, in the optical fiber according to the present disclosure, given that the number of propagation modes is (n+1), the refractive index of the cladding is lower than an effective refractive index of an n-th order mode and higher than an effective refractive index of an (n+1)-th order mode.

Further, in the optical fiber according to the present disclosure, a thickness of the air layer is equal to or less than 1.6 μm.

Further, in the optical fiber according to the present disclosure, a relative refractive index difference Δ of the core to the cladding is as follows:

$$0.0748a^{-1.962} < \Delta < 0.18a^{-1.941} \qquad \text{[Math. 4]}$$

where a is a radius of the core.

In addition, the above inventions each disclosed can be combined as much as possible.

Advantageous Effects of Invention

According to the present disclosure, it is practicable to provide an optical fiber having a simple structure, as well as attaining removal of loss components generated in an electric field part oozing out to a core-clad interface or a clad region and reduction in scattering loss generated from an interface with the clad region.

DESCRIPTION OF EMBODIMENTS

Figure 1A:
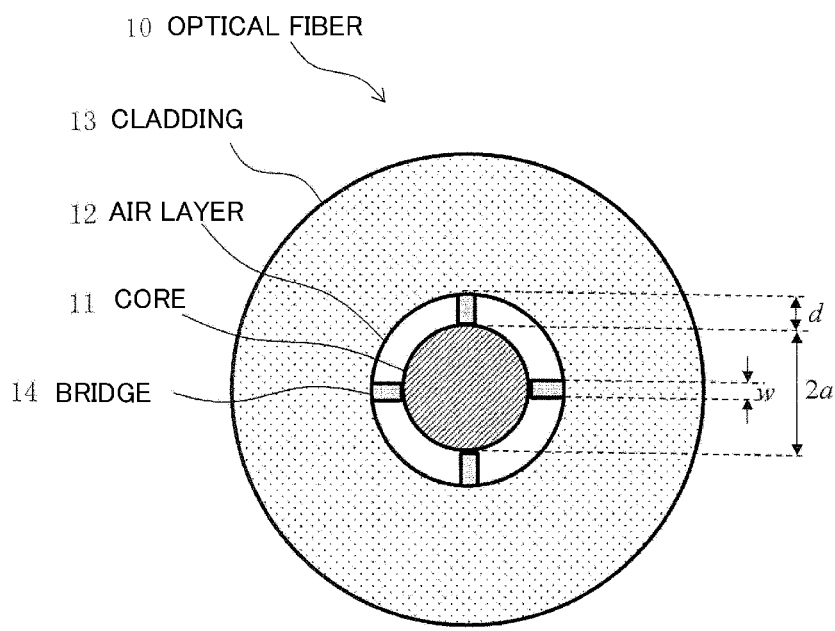
FIG. 1A is a diagram illustrating a structure of an optical fiber according to the present disclosure.

Embodiments of the present disclosure will be described hereinafter in detail with reference to the drawings. It is to be understood that the present disclosure is not limited to the embodiments described below. The embodiments are merely exemplary and the present disclosure can be implemented in various modified and improved modes based on knowledge of those skilled in the art. Constituent elements with the same reference signs in the present specification and in the drawings represent the same constituent elements.

Figure 1B:
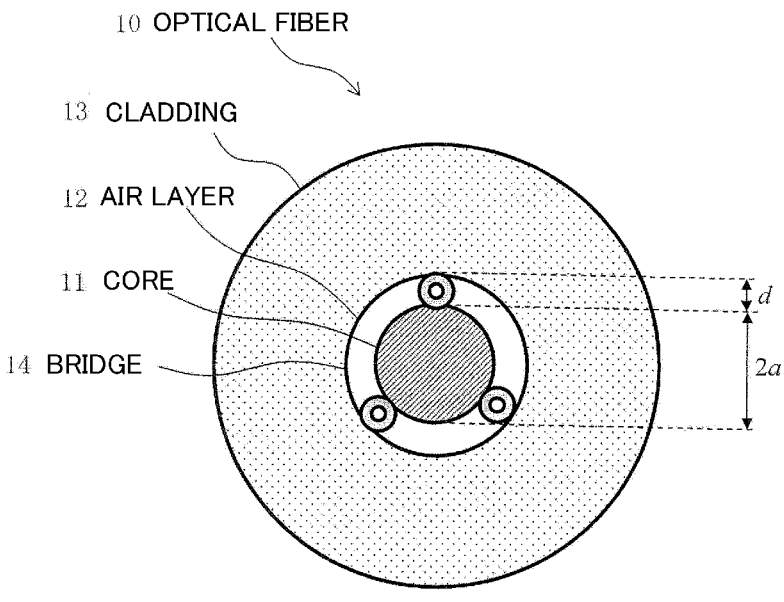
FIG. 1B is a diagram illustrating a structure of an optical fiber according to the present disclosure.

FIGS. 1A and 1B show structures optical fibers according to the present disclosure. FIGS. 1A and 1B show cross sections perpendicular to the longitudinal direction of optical fibers. In FIGS. 1A and 1B, reference numeral 10 denotes an optical fiber, reference numeral 11 denotes a core, reference numeral 12 denotes an air layer, reference numeral 13 denotes a cladding, reference numeral 14 denotes bridges. The optical fiber 10 of the present disclosure has a structure in which the air layer 12 is provided between the core 11 for propagating light and the cladding 13 arranged therearound, and the core 11 is supported by the bridges 14 in the air layer 12. This structure is uniform in the longitudinal direction of the optical fiber.

As shown in FIGS. 1A and 1B, the structure of the optical fiber of the present disclosure can be simpler than that of the hollow core optical fiber, because of the structure in which the core 11 is supported by the bridges 14.

By this structure, the light wave propagates only inside the air layer 12 by virtue of total reflection, and the electric field distribution of the propagation mode is confined in the core 11, so that loss components generated in the electric field part oozing out to the core-clad interface or the clad region can be removed, and scattering loss generated from the interface with the clad region can be reduced. Therefore, the loss characteristic of the material constituting the core 11 is dominant in the transmission loss, and the transmission loss can be less than that of the conventional optical fiber.

Although the cross section of the bridge is rectangular in FIG. 1A, it may be circular as shown in FIG. 1B. Further, a long circle, an ellipse, a corner round rectangle, concentric circles family or the like may be used. In FIG. 1A, the number of bridges 14 is four, but the number of bridges just needs to be two or more. The air layer 12 is present between the core 11 and the cladding 13, and the bridges 14 can fix the core 11 to the center of the cladding 13.

It is generally expected that quartz glass is used for the core 11, the cladding 13 and the bridges 14. The core 11, the cladding 13, and the bridges 14 may be added with a trace amount of impurities such as $GeO_2$, F, Cl, P, $Al_2O_3$ or the like so as to control a refractive index and a material characteristic, and either kind or amount of the additive or both of them may be different in each region.

Figure 2:
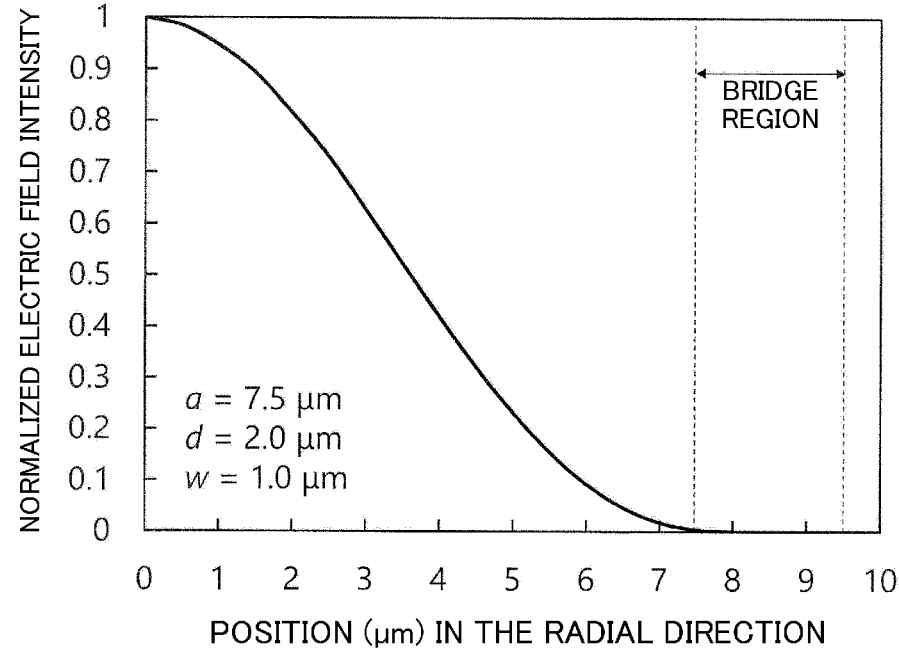
FIG. 2 is a diagram illustrating an example of an electric field distribution in an optical fiber according to the present disclosure.

An example of the electric field distribution in the optical fiber according to FIG. 1A of the present disclosure is shown in FIG. 2. In FIG. 2, the horizontal axis represents the position in the radial direction, and the vertical axis represents the normalized electric field intensity. A core radius a=7.5 μm, an air layer thickness d=2.0 μm, and a bridge width w=1.0 μm. FIG. 2 shows an electric field intensity distribution, on an axis where the bridge is present, in the radial direction from the center of the optical fiber. Since the electric field distribution is sufficiently confined within the core radius, i.e. 7.5 μm or less, and the electric field spreading in the bridge region is 0.1% or less, it can be confirmed that the loss characteristic is dominantly derived from the core material.

That is, since the electric field distribution of the propagation mode is confined in the core 11, loss components generated in an electric field part oozing out to the core-clad interface or the clad region can be removed, and scattering loss generated from the interface with the clad region can be reduced.

Figure 3:
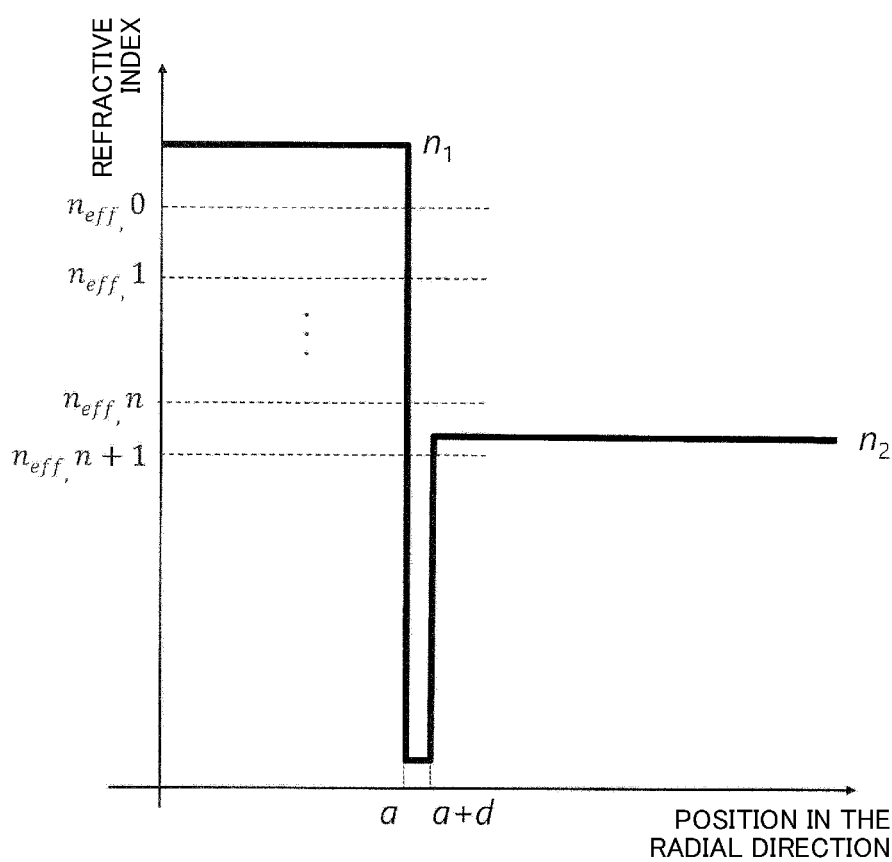
FIG. 3 is a diagram illustrating an example of a refractive index distribution in an optical fiber according to the present disclosure.

FIG. 3 is a schematic diagram showing the relationship between the refractive index distribution and the waveguide mode of the optical fiber according to the present disclosure. In FIG. 3, the horizontal axis represents the position in the radial direction, and the vertical axis represents the refractive index. The refractive index from the center to the core radius a is n1, the refractive index of the air layer is 1, and the refractive index from the position a+d of the cladding is n2. The number of the latter half of the effective refractive index $n_{eff}$ is the order of the propagation modes. The 0th order is the basic mode. By setting the refractive index of the cladding 13 lower than that of the core 11, the propagation modes can be controlled with the number thereof freely selected. In propagating (n+1) propagation modes including the basic mode, by means of setting the refractive index of the cladding 13 lower than the effective refractive index of the n-th order propagation mode and higher than the effective refractive index of the (n+1)-th order propagation mode, the modes each of which is of order equal to or higher than the (n+1)-th order can be leaked and the propagation mode can be of order equal to or lower than the n-th order.

It is understood from this that the number of propagation modes can be controlled by defining either one or both of the refractive index of the core 11 and the refractive index of the cladding 13.

Figure 4A:
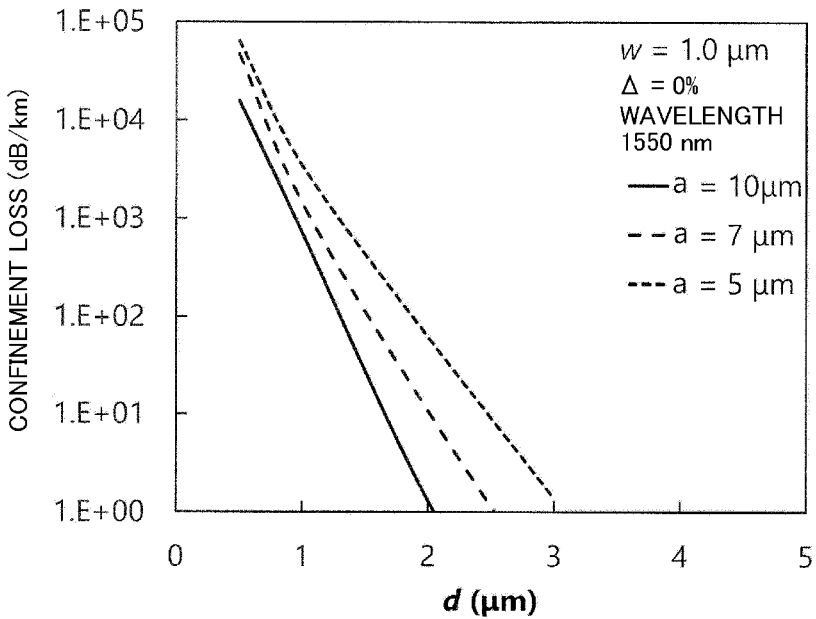
FIG. 4A is a diagram illustrating a relationship between an air thickness and a confinement loss for a basic mode.
Figure 4B:
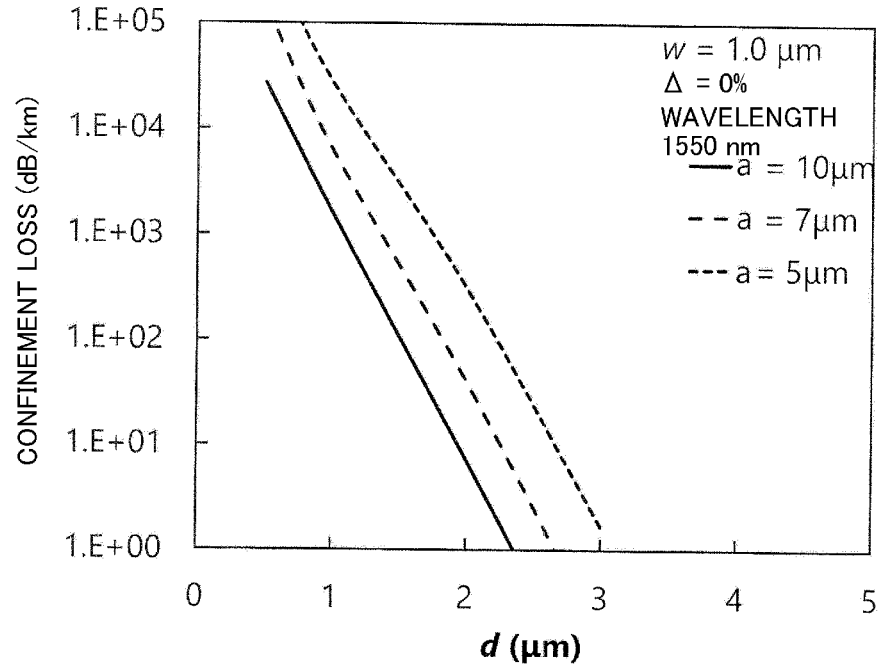
FIG. 4B is a diagram illustrating a relationship between an air thickness and a confinement loss for a first higher order mode.

The relationship between the air layer thickness d and the confinement loss with respect to the basic mode is shown in FIG. 4A, and the relationship between the air layer thickness d and the confinement loss with respect to the first higher order mode is shown in FIG. 4B. The wavelength used is 1, 550 nm, the bridge width w is 1.0 μm, and the core radius is set to a=10 μm, 7.5 μm, and 5 μm as parameters. As shown in FIG. 4A, when the thickness d of the air layer is equal to or less than 1.55 μm which is the wavelength of the propagation light, the confinement loss is as much as several hundred dB/km or more. As shown in FIG. 4B, as in the basic mode, when the air layer thickness d is 1.55 μm or less which is the wavelength of the propagation light, the confinement loss is several hundred dB/km or more, and the leakage mode is attained. When the wavelength of the propagation light is up to about 1.6 μm, the thickness d of the air layer is preferably 1.6 μm or less.

Therefore, since the air layer 12 has a very strong confinement effect, it is understood that a desired high-order mode can be leaked with the thickness d of the air layer about or less than the used wavelength.

Figure 5:
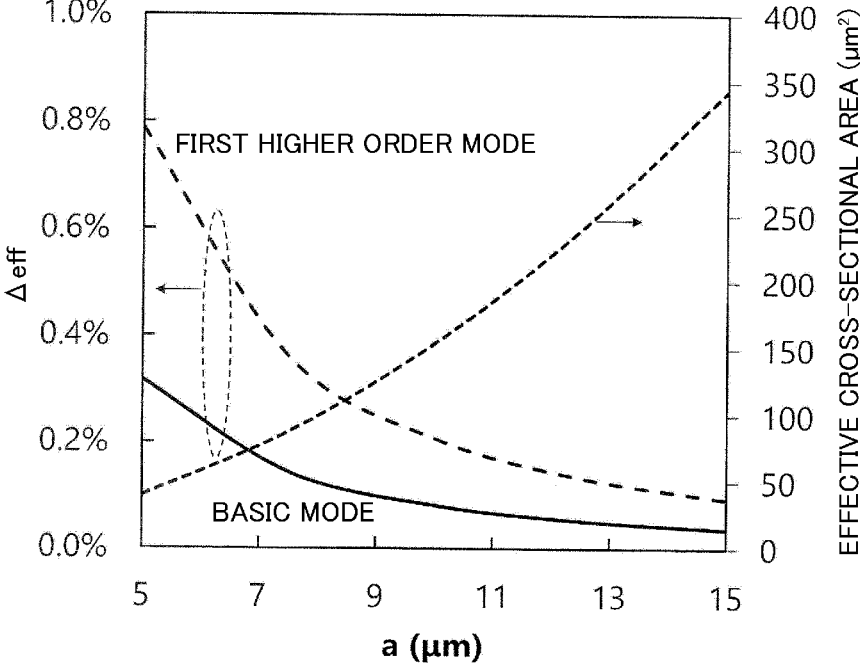
FIG. 5 is a diagram illustrating a relationship between a core radius and an effective refractive index of a propagation mode, and a relationship between the core radius and an effective cross-sectional area.

FIG. 5 shows the relationship between the core radius a and the effective refractive index Δeff of the propagation mode, and the relationship between the core radius a and the effective cross-sectional area of the optical fiber of the present disclosure. Here, the wavelength is 1,550 nm. A longitudinal axis Δeff of the left side is a relative refractive index difference of a basic mode of a refractive index n1 of the core to an effective refractive index of a first higher order mode. It is defined below.

$$\Delta_{eff} = \frac{n_1^2 - n_{eff,i}^2}{2n_1^2}$$ [Math. 1]

neff,0: The effective refractive index of the basic mode
neff,1: The effective refractive index of the first higher order mode As shown in FIG. 3, since the number of propagation modes is determinable on the basis of the refractive index of the cladding 13, given that the relative refractive index difference of the core 11 with respect to the cladding 13 is A, a single mode operation is performed with the relative refractive index difference Δ set to a value between a solid line and a broken line in FIG. 5. Here, when the solid line and the broken line in FIG. 5 are approximated by power functions, where the core radius is a, each of them, resulting from approximation, is adequately as follows:

$$\Delta eff = 0.0748a^{-1.962}$$ [Math. 2]

$$\Delta eff = 0.18a^{-1.941}$$

Therefore, given the following equation, a single mode operation can be obtained at the wavelength 1,550 nm.

$$0.0748a^{-1.962} < \Delta < 0.18a^{-1.941}$$ [Math. 3]

The dotted line represents the effective cross-sectional area of the core. Since the electric field is determined only by the material of the core 11 and is not affected by the refractive index of the air layer 12 nor the cladding 13, the effective cross-sectional area of the core can be determined uniquely only by the core radius. For example, when the effective cross-sectional area is equal to or more than that of a general-purpose single mode fiber (80 μm² at 1550 nm wavelength), the core radius a may be set equal to or more than 7 μm.

Figure 6:
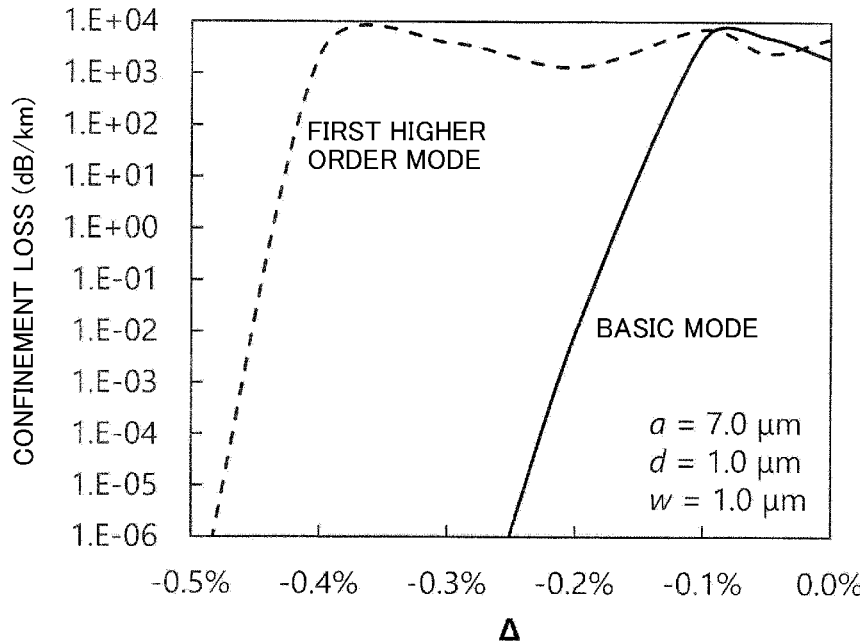
FIG. 6 is a diagram illustrating a relationship between a relative refractive index difference, between a core and a cladding, and a confinement loss.

The relationship between the relative refractive index difference Δ, between the core and the cladding, and the confinement loss according to the optical fiber of the present disclosure is shown in FIG. 6. As shown in FIG. 6, regarding the basic mode, the loss rapidly decreases when the relative refractive index difference Δ is about −0.15% or less, whereas regarding the first higher order mode, the confinement loss is the sufficiently large when about −0.4% or less, so that the single mode operation within a range of Δ of −0.15 to −0.4% can reduce the loss of the basic mode. This range also corresponds to Math. 3.

Figure 7A:
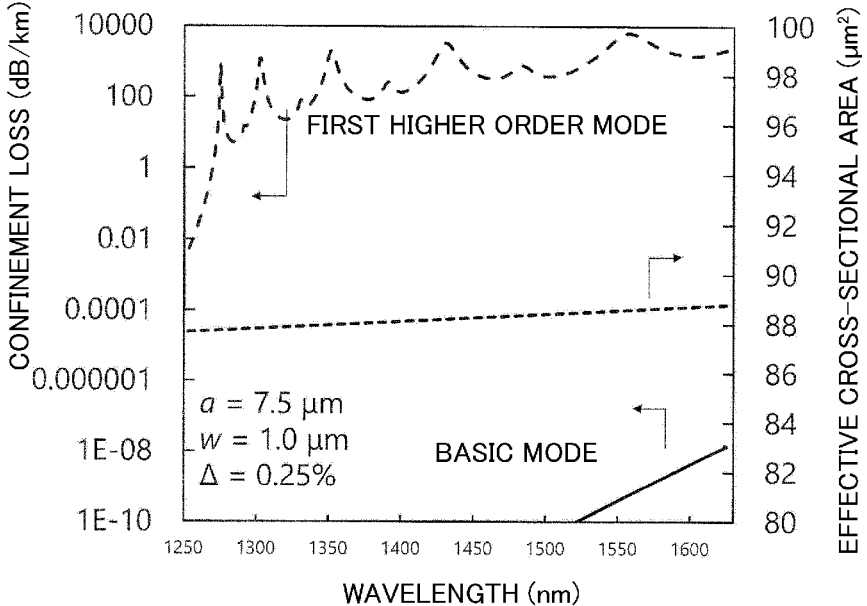
FIG. 7A is a diagram illustrating a relationship between a confinement loss and a wavelength, and a relationship between an effective cross-sectional area and the wavelength.

The relationship between the confinement loss and the wavelength, and the relationship between the effective cross-sectional area and the wavelength of the optical fiber of the present disclosure are shown in FIG. 7A. A single mode operation is within a wavelength range of 1530 to 1625 nm, and a construction has a reducible loss of the basic mode. From FIG. 7A, it can be confirmed that the confinement loss of the basic mode is as little as 10⁻⁷ dB/km or less, and the first higher order mode, by contrast, leaks with a loss as much as 1000 dB/km or more. It is understood that the effective cross-sectional area is about 88 μm² and the wavelength dependency is very small. In view of the fact that the wavelength dependency of the effective cross-sectional area is large in the conventional optical fiber, it is understood that the optical fiber of the present disclosure particularly provides an effect of enlarging the effective cross-sectional area on the short wavelength side, and provides the low nonlinearity.

Figure 7B:
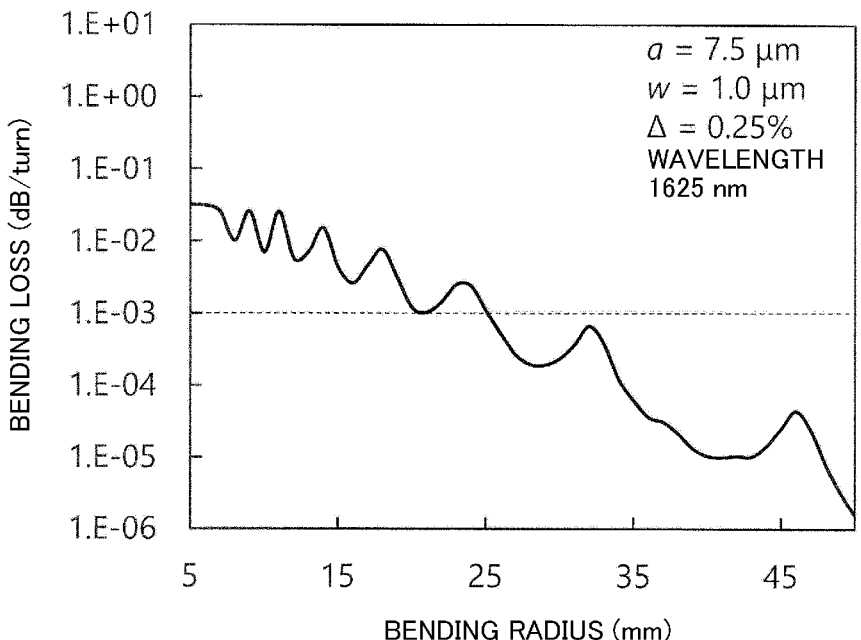
FIG. 7B is a diagram illustrating a relationship between a bending loss at a wavelength of 1625 nm and a bending radius.

The relationship between the bending loss at a wavelength of 1625 nm and the bending radius of the optical fiber of the present disclosure is shown in FIG. 7B. It can be confirmed that the bending loss is reduced in response to the expansion of the bending radius, and that the bending loss with 0.1 dB/100 turn or less at the bending radius 30 mm or more is obtainable, which is equal to or less than the general-purpose optical fiber.

As described above, the optical fiber of the present disclosure can have a simple structure, as well as attain removal of loss components generated in the electric field part oozing out to the core-clad interface or the clad region and reduction in scattering loss generated from the interface with the clad region.

INDUSTRIAL APPLICABILITY

The present disclosure is applicable to the optical communications industry.

REFERENCE SIGNS LIST

10: Optical fiber
11: Core
12: Air layer
13: Cladding
14: Bridge

The invention claimed is:
1. An optical fiber comprising:
a core for propagating light,
a cladding disposed around the core;
an air layer between the core and the cladding; and
two or more bridges for supporting the core in the air layer;
wherein a refractive index of the cladding is lower than a refractive index of the core; and
wherein, given that the number of propagation modes is (n+1), the refractive index of the cladding is lower than an effective refractive index of an n-th order mode and higher than an effective refractive index of an (n+1)-th order mode.
2. The optical fiber according to claim 1, wherein a thickness of the air layer is equal to or less than 1.6 μm.
3. An optical fiber comprising:
a core for propagating light,
a cladding disposed around the core;
an air layer between the core and the cladding; and two or more bridges for supporting the core in the air layer, wherein a relative refractive index difference Δ of the core to the cladding is as follows:

$$0.0748a^{-1.962} < \Delta < 0.18a^{-1.941} \qquad \text{[Math. 4]}$$

where a is a radius of the core.

4. The optical fiber according to claim 3, wherein a refractive index of the cladding is lower than a refractive index of the core.

5. The optical fiber according to claim 4, wherein, given that the number of propagation modes is (n+1), the refractive index of the cladding is lower than an effective refractive index of an n-th order mode and higher than an effective refractive index of an (n+1)-th order mode.

6. The optical fiber according to claim 3, wherein a thickness of the air layer is equal to or less than 1.6 μm.

\* \* \* \* \*